United States Patent [19]

Nakamura et al.

[11] 4,347,614
[45] Aug. 31, 1982

[54] APPARATUS FOR REFINING FERROSILICON

[75] Inventors: Yoshiyuki Nakamura; Seiichi Matsubara, both of Tokyo; Takashi Matsui, Yokohama; Taiji Kumagai, Ichikawa; Taizo Senga, Waga; Tsutomu Fukutsu, Yokohama, all of Japan

[73] Assignee: Japan Metals & Chemicals Co., Ltd., Tokyo, Japan

[21] Appl. No.: 127,279

[22] Filed: Mar. 5, 1980

Related U.S. Application Data

[62] Division of Ser. No. 53,480, Jun. 29, 1979, Pat. No. 4,255,184.

[30] Foreign Application Priority Data

Jul. 18, 1978 [JP] Japan ................................. 53-86782
Jul. 18, 1978 [JP] Japan ................................. 53-86783

[51] Int. Cl.³ ............................................. H05B 7/00
[52] U.S. Cl. ........................................ 373/77; 373/81; 373/86
[58] Field of Search .................... 13/33, 9 R, DIG. 1

[56] References Cited

U.S. PATENT DOCUMENTS

| | | | |
|---|---|---|---|
| 3,423,080 | 1/1969 | Keyser | 13/9 |
| 3,666,871 | 5/1972 | Thom et al. | 13/33 |
| 3,679,806 | 7/1972 | Reth et al. | 13/9 |
| 3,746,771 | 7/1973 | Horibe et al. | 13/33 |
| 3,827,877 | 8/1974 | Pantke et al. | 13/33 |
| 3,909,499 | 9/1975 | Stark | 13/1 |
| 3,997,711 | 12/1976 | Stark et al. | 13/9 R |
| 4,005,252 | 1/1977 | Krogsrud | 13/13 |

FOREIGN PATENT DOCUMENTS 665136 6/1963 Canada ................................. 13/9

Primary Examiner—Bernard Roskoski
Attorney, Agent, or Firm—Ladas & Parry

[57] ABSTRACT

A gas having high CO content evolved at reaction zone in a ferrosilicon-refining electric furnace is burned and deflected to wipe transversely on the top level of the charged raw materials with the aid of air introduced near electrodes through an air pipe. The burning of the gas is so controlled that a content of oxygen in the burned gas is within a range of 12–17% by volume by controlling a volume of the air to be introduced near electrodes as well as a volume of air invading into the furnace through a poking window and a gap between a shell of the furnace and a heat-shielding hood above the furnace. The CO-rich gas which has heretofore been exhausted in vain from the furnace can now be used to preheat the charged raw materials and prevents the furnace from blocking due to formation of crusts at the top level of the charged raw materials. The exhaust gas is now less noxious, has a higher temperature that can be used for driving a turbine of a generator. High heat efficiency, high quality of ferrosilicon, useful electric power and less blocking troubles can be obtained in a simple and economical way.

3 Claims, 3 Drawing Figures

APPARATUS FOR REFINING FERROSILICON

This is a division, of application Ser. No. 53,480 filed June 29, 1979 now U.S. Pat. No. 4,255,184 issued 03/10/81.

BACKGROUND OF THE INVENTION

1. Field of the Invention

The present invention relates to an electric furnace for refining ferrosilicon.

2. Description of the Prior Art

Heretofore, submerged arc type open electric furnaces have been prevailingly used in refining ferrosilicon, wherein a gas evolved in a reaction zone and consisting mainly of CO is contacted and burned with air at top level of charged raw materials to generate plenty of heat. Therefore, a heat-shielding hood has to be provided above an upper rim of a shell of the furnace to protect upper equipments of the furnace and to lead the burned gas out of a house which accomodates the furnace. The burned gas is sucked through a duct or the like, cooled, introduced in a dust collector such as a bag filter, and exhausted to the atmosphere after a removal of dusts.

In such a case, air for contacting with the CO gas rising from the reaction zone above the top level of the charged raw materials invades from a window arranged on an upright wall of the heat-shielding hood for poking the charged raw materials in the furnace as well as from a gap between a lower end of the upright wall and the upper rim of the shell. Said invaded air flows at first transversely on the top level of the charged raw materials and reaches around electrodes near the central area in the top level of the charged raw materials and contacts with the rising CO gas from the reaction zone thereby to burn the CO gas, and the burned gas is guided to a duct arranged at an upper part of the heat-shielding hood and discharged therefrom.

During the transverse flow, the invaded air cools the top level of the charged raw materials before its contact with the rising CO gas. While, the charged raw materials form firm crusts, because silica sintered at high temperature under an influence of high heat transmitted from the lower reaction zone is cooled from upward by the invaded air and SiO component contained in the rising CO gas deposits on the charged raw materials of lower temperature. The crusts gradually grow from the outer periphery to the central part of the top level of the charged raw materials and finally hanged at the top level of the charged raw materials and prevent the raw materials from descending. When such crusts have been formed, only the raw materials charged in a narrow zone of high temperature around the electrodes are melted and fall down into the reaction zone. As a result, a phenomenon occurs frequently that the raw materials are insufficiently supplied to the tip ends of the electrodes immersed in the raction zone.

Accordingly, in order to prevent formation of such crusts and hanging of raw materials, poking bars must be thrusted through a plurality of windows for poking arranged on the circumferential periphery of the upright wall of the heat-shielding hood and poke (so called "poking") the hanging crusts, thereby to break down and cause to descend the hanging crusts and the raw materials satisfactorily into the lower reaction zone. However, conventional methods of refining ferrosilicon have problems that thickness and length of the formed hanging crust become larger respectively owing to the cooling of the top level of the charged raw materials by the transverse flow of the invaded air and hence frequent and deliberate poking operations are always required, because, otherwise, supply of the raw materials into the reaction zone becomes insufficient quickly, the reaction zone is overheated by arc, gas blows of high temperature occur locally in the area where the raw materials are melted and fall away, and required electric power per unit weight of product is increased and yield of silicon is decreased due to increase of heat loss, sputtered silica stones and cokes and diffusion loss of SiO vapor etc.

The aforementioned poking operation has also drawbacks that it must be effected at a hot environment suffering from high radiation heat from the electric furnace, that areas to effect poking have become large due to scale-up of electric furnaces in recent years and long time is required in effecting poking operations at necessary areas in good timing, and that sufficient poking operations are difficult and refining efficiency decreases unavoidably due to blowout of hot gas during the poking operations.

SUMMARY OF THE INVENTION

The present invention solves the abovementioned problems of conventional electric furnaces for refining ferrosilicon.

An object of the present invention is to provide a semi-closed electric furnace for refining ferrosilicon, having a shell of the furnace, a heat-shielding hood having an upright wall and arranged over the shell, vertically arranged electrodes penetrating the heat-shielding hood, a pipe for charging raw materials arranged around the electrodes, at least one window for poking charged raw materials and arranged on the upright wall, and a duct for discharging an exhaust gas arranged at an upper portion of the heat-shielding hood, the improvements comprising, a plurality of air-introducing pipes each having a lower mouth opened near top level of charged raw materials around the electrodes and a means for adjusting at least one of an opening of the poking window and a gap between a lower end of the upright wall and an upper rim of the shell.

A further object of the present invention is to provide the electric furnace which further comprises a means for controlling a sum of a volume of the air introduced and a volume of air invaded into the heat-shielding hood from the gap and the poking window and a ratio of invaded air volume to a sum of the introduced air volume plus the invaded air volume depending on a content of oxygen in the exhaust gas.

A still further object of the present invention is to provide the electric furnace which further comprises a means for enriching a content of oxygen in the air which is introduced through the air-introducing pipe.

Another object of the present invention is to provide the electric furnace which further comprises an ascendable and descendable longitudinal annular collar arranged in the gap between the lower end of the upright wall and the upper rim of the shell, the lower end of the collar being capable of reaching down to a sand-seal trough arranged on an outer periphery of the upper rim of the shell.

Another object of the present invention is to provide the electric furnace wherein a plurality of poking windows are openable by constituting each of them as a door hinged to a frame of the window.

Another object of the present invention is to provide the electric furnace wherein a pipe for charging raw materials is used also as the air-introducing pipe.

These and other objects of the present invention will be apparent from the ensuing descriptions of the specification.

DETAILED EXPLANATION OF THE INVENTION

Figure 1:
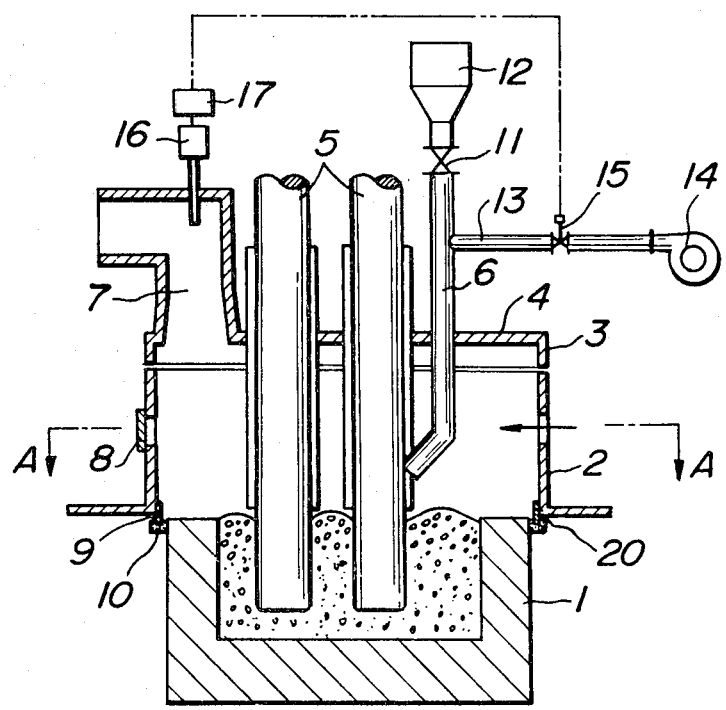
FIG. 1 is a schematic longitudinal cross-sectional view of a preferred embodiment of the electric furnace according to the present invention.

A conventional refining process in an electric furnace for refining ferrosilicon can be scrutinized by dividing it to the following a-c zones with reference to FIG. 1 which shows schematically an electric furnace with the upper equipments which will later be explained in more detail.

a. High Temperature Zone at Furnace Bottom

This is a zone of highest temperature in the furnace due to arc from electrodes 5,5, wherein a reaction takes place that silica stones in raw materials charged from top of the furnace is reacted with SiC formed in an intermediate reaction zone which will subsequently be explained to form SiO and Si as shown in the following equation (1).

$$3SiO_2 + 2SiC \rightarrow 4SiO + Si + 2CO \tag{1}$$

The reaction is a main reaction for forming Si and Strongly endothermic, so that position of the electrodes must be controlled as best as possible for concentrating heat in operating the furnace.

b. Intermediate reaction zone

In this zone, mainly a reaction takes place that SiO formed at the highest temperature zone in the furnace bottom is reacted with carbonaceous material in the charged raw materials to form SiC as shown in the following equation (2).

$$2SiO + 4C \rightarrow 2SiC + 2CO \tag{2}$$

The above reaction proceeds partially also at top level of the charged raw materials.

c. Top level reaction zone

In this zone, a reaction takes place that the rising remaining SiO-vapor unreacted in the intermediate reaction zone is heat exchanged with the charged raw materials cooled by introduction of the invaded air in the furnace to form brown condensate of [SiO₂+Si] as shown in the following equation (3).

$$2SiO \rightarrow [SiO_2 + Si] \tag{3}$$

Since the reaction is exothermic, SiO generates heat when it is converted to brown condensates, forming a heat source to preliminary heat the charged raw materials. However, though the brown condensates around the electrodes are melted and fall down spasmodically by high temperature, those brown condensates remote from the electrodes are not melted and fall down and become crusts to occur a hanging of the raw materials and obstruct issuance of CO gases from the lower charged raw materials, because a cooling effect which exceeds the generated heat is exhibited by decrease of temperature of the top level of the charged raw materials due to the introduction of the invaded air. The obstructed gases gather at open spaces around the electrodes to become a cause of a strong local blow.

Now, according to the present invention, air-introducing pipes 6 are arranged around the electrodes 5,5 for introducing a controlled volume of air and the volume of the invaded air is controlled by adjusting an opening of a poking window 8 arranged on the upright wall or by adjusting a gap 20 between a lower end of the upright wall 2 of the heat-shielding hood 3 and an upper rim of the shell 1 of the furnace, whereby a flow direction of a combustion flame of a combustible CO gas rising from the reaction zones is deflected to a new direction of flowing radially from the central part of the furnace to the circumferential part of the furnace along the top level of the charged raw materials. Therefore, a phenomenon is much lessened that the top level of charged raw materials is cooled as in conventional refining electric furnace, thus the top level of the charged raw materials is rather heated conveniently. As a result, formation of strong crusts is not be seen at all, and the charged raw materials descend moderately and smoothly into the reaction zones in the furnace, and the reaction gas rises smoothly through the particles of the descending raw materials, so that the refining reaction proceeds stably without forming any hanging of raw materials or local blows etc. as seen in conventional furnace, so that required materials, electric power, electrodes and the like per unit weight of product are exceedingly decreased and quality of the produced ferrosilicon becomes uniform. Besides, if a content of oxygen in the introduced air is enriched with a small amount of oxygen, top level of the charged raw materials can advantageously be heated further, and descent of the raw materials is improved, and required electric power per unit weight of product is decreased.

A volume of the invaded air and a volume of the introduced air are controlled depending on a concentration of oxygen in the exhaust gas discharged from the heat-shielding hood through a gas exhaust duct 7, because we have found out that a temperature rise in the charged raw materials by the effective heating of the top level of the charged raw materials is intimately related with a concentration of oxygen in the exhaust gas. A concentration of oxygen in the exhaust gas should be retained in a range of 12-17% by volume, because at less than 12% a temperature of the top level of the charged raw materials becomes too high and smooth descent of raw materials is obstructed owing to local occurrence of fusion of silica stones of small diameter, while at more than 17% the charged raw materials are rather cooled and a temperature of top level thereof does not rise and firm crusts are formed.

Hereinafter, the present invention will be explained with reference to experimental data.

There were locally considerable variations in temperatures at the top level of the charged raw materials, so that concentrations of oxygen and temperatures of the exhaust gas discharged from the heat-shielding hood through the gas exhaust duct were measured instead of measuring temperatures of the top level of the raw materials, which presumably correspond well to an average temperature of the top level.

A ratio of a volume of the invaded air to a volume of the introduced air was kept constant at 80:20. Sum of volumes of the invaded air and the introduced air were changed variously and concentrations of oxygen in the exhaust gas, temperatures of the exhaust gas, melted and fallen surface areas of the raw materials at the top level versus surface areas of the top level, presence or absence of fusion of silica stones in the raw materials were measured. The results were shown in the following Table 1.

TABLE 1

| Air volume ratio (times) | 60 | 45 | 19 | 16 | 12 | 10 |
|---|---|---|---|---|---|---|
| $O_2$ concentration in exhaust gas (dry basis volume %) | 19.2 | 18.5 ±0.2 | 17.0 ±0.2 | 14.5 ±0.2 | 12.0 ±0.2 | 10.0 ±0.2 |
| Temperature of exhaust gas (°C.) | 260 | 350 ±40 | 800 ±50 | 900 ±80 | 1,100 ±120 | 1,200 ±150 |
| Melted and fallen area at top level of raw materials / Area of top level of furnace | 0.33 | 0.44 | 0.60 | 0.65 | 0.65 | 0.63 |
| Fusion of silica stone | none | none | none | none | none | yes |

As seen from the above Table 1, the larger the ratio of air volumes was, the lower the temperature of the exhaust gas was and narrower the melted and fallen area at the top level of the raw material was. When the ratio of the air volumes was small, a contrary phenomenon occurred, especially a phenomenon occurred that the melted and fallen area at the top level of the raw materials was enlarged which is most preferable in operating an electric furnace. However, when the temperature of the exhaust gas was 1,200° C. and the ratio of the air volumes is 10, fusion of silica stones occurred and the melted and fallen area at the top level of the raw materials became narrow. Also, as seen from the Table 1, variations in concentrations of oxygen in the exhaust gas were considerably small, whereas variations in temperatures of the exhaust gas were considerably large.

In a study leading to this invention, the following experiments were performed wherein the ratio of an invaded air volume to a sum of an introduced air volume plus the invaded air volume was changed variously, while keeping the sum of an invaded air volume and an introduced air volume constant.

Figure 3:
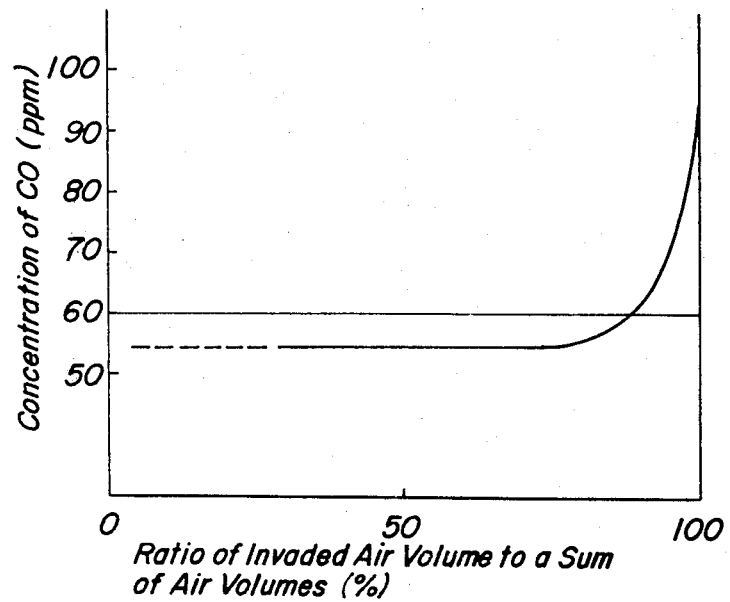
FIG. 3 is a characteristic curve showing a relation between a ratio of an invaded air volume to a sum of an invaded air volume plus an introduced air volume and a content of carbon monoxide in the exhaust gas.

FIG. 3 shows a relation between the ratio in percentage of an invaded air volume to a sum taken as 100% of an invaded air volume and an introduced air volume and CO concentrations in the exhaust gas discharged from the gas exhaust duct arranged on the heat-shielding hood. As seen from the FIG. 3, a concentration of CO in the exhaust gas was 55 ppm when the ratio of an invaded air volume to the sum of the air volumes was 80% or less, but the CO concentration increased sharply when the ratio exceeded 90%.

Meanwhile, if the ratio of an invaded air volume to the sum of the air volumes decreased to less than 60%, a concentration of CO in the exhaust gas did not change remarkably, and an introduced air volume from the air-introducing pipe had to be increased, so that an additional power was required for introducing the increased air volume.

Therefore, preferably the ratio of an invaded air volume to a sum of the air volumes is kept within a range of 60-90%.

A reason of controlling the volumes of the invaded air and the introduced air or the ratio of an invaded air volume to a sum of an introduced air volume plus the invaded air volume depending on a change of a concentration of oxygen detected by an oxygen meter is because we have found out that the most appropriate way of controlling said volumes or said ratio is to use a concentration of oxygen in the exhaust gas discharged from the gas exhaust duct 7 which corresopnds well to an average temperature of the top level of the raw materials since a temperature of the top level of the raw materials locally varies considerably. In addition to a concentration of oxygen, a temperature of the exhaust gas can also be taken into consideration to some extent. However, we have also found out that a temperature of the exhaust gas is easily influenced by an atmospheric temperature, an applied electric voltage, a local blow, radiation and the like, so that an exhaust gas temperature does not so intimately correspond to a temperature of the top level of the raw materials as a concentration of oxygen in the exhaust gas does.

A temperature of the top level of the raw materials charged in the furnace can advantageously be raised by enriching oxygen content in the air introduced from the air-introducing pipe.

Preferably, the air to be introduced is uniformly introduced on the top level of the charged raw materials.

Heat retained in the exhaust gas can now be used to produce steam for generating electric power or other use, because a temperature of the exhaust gas is so high.

DESCRIPTION OF THE PREFERRED EMBODIMENT

Hereinafter, the present invention will be explained in more detail with reference to the accompanying drawings and a working example, which however should not be construed by any means as limitation of the scope of the present invention.

Figure 2:
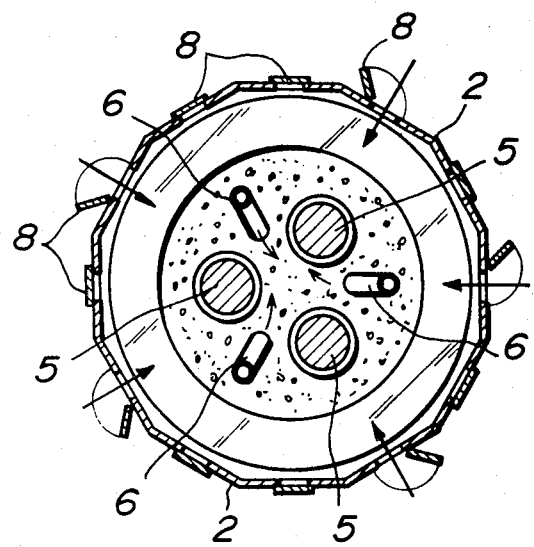
FIG. 2 is a schematic lateral cross-sectional view thereof taken along the line A—A of FIG. 1.

FIGS. 1 and 2 indicate a preferred embodiment of the electric furnace according to the present invention.

In FIGS. 1 and 2, the electric furnace according to the present invention is provided with a heat-shielding hood 3 which has an upright wall 2 positioned near an upper rim of a shell 1 of the furnace. A top cover 4 of the heat-shielding hood 3 is penetrated by electrodes 5,5 and a pipe 6 for charging raw materials. An upper portion of the heat-shielding hood 3 is connected with a gas exhaust duct 7 for discharging a burned gas. A plurality of openable windows 8 for poking the charged raw materials are arranged on the upright wall 2 of the hood 3. An elevatable or descendable longitudinal annular collar 9 is provided to adjust a gap 20 between a lower end of the upright wall 2 and an upper rim of the shell 1 by lowering a lower end of the collar 9 into a sand seal trough 10 arranged around an upper periphery of the shell 1. Upper portion of the raw materials-charging pipe 6 is connected with a tank 12 for storing raw materials via a feeder 11. An air-introducing pipe 13 is connected with the raw materials-charging pipe 6 below the feeder 11. Air is blown into the air-introducing pipe 13 from a blower 14 through a valve 15 for regulating a volume of the introducing air and injected into the furnace through a lower mouth of the raw materials-charging pipe 6. If desired, the air-introducing pipe 13 may be arranged separately from the raw materials-charging pipe 6.

A meter 16 for monitoring a concentration of oxygen is provided in the gas exhaust duct 7 to adjust an opening of the valve 15 for regulating a volume of the air to be introduced by means of a regulator 17 depending on change of oxygen concentration detected by the oxygen meter 16.

EXAMPLE

In this example, the method of the present invention was compared with a conventional method.

Refining of ferrosilicon to a purity of 75% was effected for 30 days, using a 4000 KVA Sederberg type electric furnace, a ratio of invaded air volume to the sum of the air volumes of 80%, and an $O_2$ concentration in the exhaust gas of 14.5% by volume on dry basis.

A standard receipt for compounding the raw materials in this example was as follows. Weights expressed in kg are on non-moisture basis.

Silica stone: 1,000 kgs ($SiO_2$ 97.5% by wt. size 20–40 mm)
coke: 306 kgs (FC 88% by wt. size 3–10 mm)
coal: 230 kgs (FC 52% by wt. size −10 mm)
mill scale: 153–132 kgs (Fe 72% by wt.)
wood chip: 150 kgs The results are shown in the following Table 2 wherein those of a conventional method are also incorporated for comparison.

TABLE 2

|  | Present invention | Conventional open type |
|---|---|---|
| Capacity of transformer of electric furnace | 4,000 KVA | 4,000 KVA |
| Average load of electric power | 3,342 KW | 3,330 KW |
| Electrode diameter | 61 cm | 61 cm |
| Secondary side voltage | 100 V | 100 V |
| Secondary side ampere | 20,500 A | 20,500 A |
| Area of furnace bed | 7.5 m$^2$ | 7.5 m$^2$ |
| Numbers of raw materials charging pipe | 3 | 3 |
| Numbers of air-introducing pipe | 6 (Among them, 3 pipes are used also as raw materials-charging pipe) | 0 |
| Size and numbers of window arranged on upright wall | 30 cm × 40 cm × 12 | No window (opened overall) |
| Product quality | Si 76.6% by wt. | Si 76.2% by wt. |
| Production per day | 9.3 ton | 8.4 ton |
| Required electric power per unit weight of product | 8.624 KWH/t-FeSi | 9.514 KWH/t-FeSi |
| Silica stone used per day | 16,970 kg | 17,140 kg |
| Required silica stone per unit weight of product | 1,825 kg/t-FeSi | 2,040 kg/t-FeSi |
| Si yield | 92% | 82% |
| Produced dust | 135 kg/t-FeSi | 328 kg/t-FeSi |
| Required electrode per unit weight of product | 44 kg/t-FeSi | 55 kg/t-FeSi |
| Temp. of exhaust gas at the furnace top | 900pC | 260° C. |
| Temp. of top level of raw materials | 850° C. | 205° C. |
| $O_2$ conc. n exhaust gas % by vol. (on dry base) | 14.5% | 19.2% |
| Melted and fallen area of top level of raw meterials / Area of furnace bed | 0.65 | 0.33 |
| Air volume supplied to the furnace | 16 | 70 |
| Gas volume evolved in the furnace |  |  |

As seen from the above Table 2, according to the present invention, required electric power for producing a unit weight of product has been decreased by around 10% and yield of Si has been improved by around 10% as compared with a conventional method, so that it is clear that the present invention contributes to economize energy and resources and achieves a high productivity.

As explained above, according to the present invention, the reaction zone is enlarged, descent of raw materials and issuance of gas are facilitated, the refining operation is stabilized, required electric power for producing unit weight of product is decreased, yield of Si is improved, utilization of the exhaust gas can be performed efficiently and a volume of the exhaust gas is exceedingly decreased, so that a scale or size of a dust collector can be decreased.

Although the present invention has been explained in detail with reference to specific values, example and embodiment, it will be apparent to those skilled in the art that the present invention is not limited thereto and various modifications and variations can be made without departing the broad scope and aspect of the present invention as defined in the appended claims.

What is claimed is:

1. A semi-closed electric furnace for refining ferrosilicon, comprising a furnace shell having an upper rim, a heat-shielding hood having an upright wall and arranged over the shell with its lower end spaced from the upper rim of the shell by a gap, vertically arranged electrodes penetrating the heat-shielding hood, pipes arranged around the electrodes and opening above the level of the charged raw materials for charging raw materials into the region of the furnace near and around the electrodes, at least one openable window in the upright wall for poking charged raw materials, a duct for discharging exhaust gas arranged at an upper portion of the heat-shielding hood, a plurality of pressurized air-introducing pipes arranged around the electrodes, each pipe having a lower mouth opening near the level of charged raw materials around the electrodes for suppressing and burning the rising CO gas evolved at the reaction zone and for passing the burnt gas transversely from the electrodes along the surface of the charged raw materials towards the shell, means for adjusting the gap between the lower end of the upright wall and the upper rim of the shell, means for determining the concentration of oxygen in the exhaust gas, and means for controlling the sum of the volume of the air introduced by way of the air-introducing pipes and the air invaded into the heat-shielding hood from the gap and the poking window and for controlling the ratio of invaded air volume to the sum of introduced air volume plus the invaded air volume depending on the concentration of oxygen in the exhaust gas.

2. The electric furnace as defined in claim 1, wherein a plurality of poking windows are openable by constituting each of them as a door hinged to a frame of the window.

3. The electric furnace as defined in claim 1, wherein a pipe for charging the raw materials is used also as the air-introducing pipe.

* * * * *